United States Patent

Williams

[15] 3,646,595
[45] Feb. 29, 1972

[54] SOLID-GAS SEPARATING MEANS

[72] Inventor: David C. Williams, Houston, Tex.
[73] Assignee: Ashland Oil, Inc., Houston, Tex.
[22] Filed: June 11, 1969
[21] Appl. No.: 832,382

Related U.S. Application Data

[60] Division of Ser. No. 579,576, Sept. 15, 1966, Pat No. 3,491,578.
[52] U.S. Cl.....................55/284, 55/302, 55/315, 55/358, 55/341, 55/350, 55/410, 55/418, 55/431, 210/308, 210/333, 302/27, 302/59
[51] Int. Cl..................................................B01d 46/02
[58] Field of Search.........................302/59, 21, 22, 17, 27

[56] References Cited

UNITED STATES PATENTS

| | | | |
|---|---|---|---|
| 1,454,248 | 5/1923 | Marx | 55/287 |
| 1,480,399 | 1/1924 | Kling et al. | 55/288 |
| 1,944,268 | 1/1934 | Ruthbun | 55/341 X |
| 2,717,658 | 9/1955 | Bethea et al. | 302/17 X |
| 2,911,065 | 11/1959 | Yellott et al. | 55/344 X |
| 3,146,080 | 9/1964 | Ruble et al. | 55/96 |
| 3,264,806 | 8/1966 | Neumann | 55/346 |
| 3,491,518 | 1/1970 | Williams | 302/27 X |

*Primary Examiner*—Dennis E. Talbert, Jr.
*Attorney*—Walter H. Schneider

[57] ABSTRACT

A solids transport system for a plurality of parallel-connected bag-type filters which includes a solids-laden gas inlet manifold connected in parallel to the tops of the filters, having a diminishing cross section from the first of the filters served to the last of the filters served and adapted to supply solids-laden gas to the filters, a clarified gas outlet connected to the top of the filters, a solids-laden gas withdrawal line connected to the solids-laden gas manifold and adapted to withdraw a predetermined small amount of solids-laden gas from the solids-laden gas inlet manifold, a separated solids transport manifold connected in series to the filters and also connected to the solids-laden gas withdrawal line and having an increasing cross section from the first filter served to the last filter served, a recycle line having its inlet end connected to the separated solids transport manifold and its discharge end connected to the solids-laden gas inlet manifold and adapted to recycle gas from the separated solids transport manifold to the solids-laden gas inlet manifold after solids have been removed therefrom, and continuously open orifices in the bottom outlets of the filters which are successively of decreasing diameter from the first to the last of the filters served by the separated solids transport manifold. A clarified gas repressure line can also be connected to the clarified gas manifold and to each of said filters through valves which permit a continuous flow of gas through the clarified gas outlet means.

4 Claims, 11 Drawing Figures

PATENTED FEB 29 1972

INVENTOR
DAVID C. WILLIAMS

BY *Walter H. Schneider*

ATTORNEY

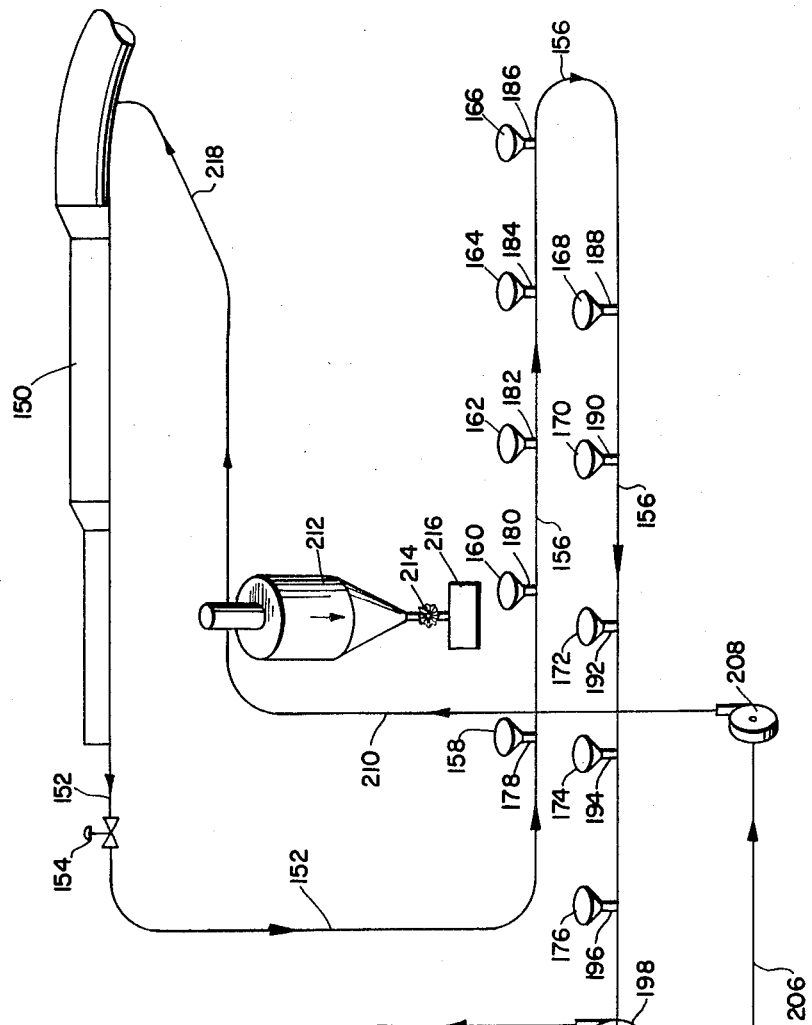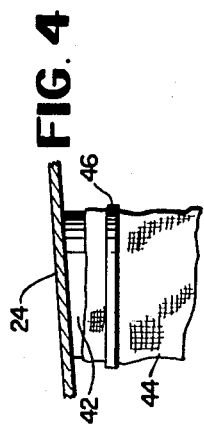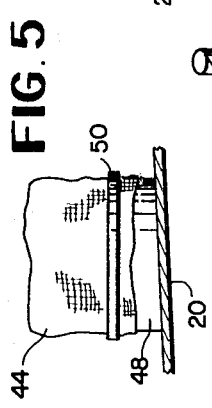

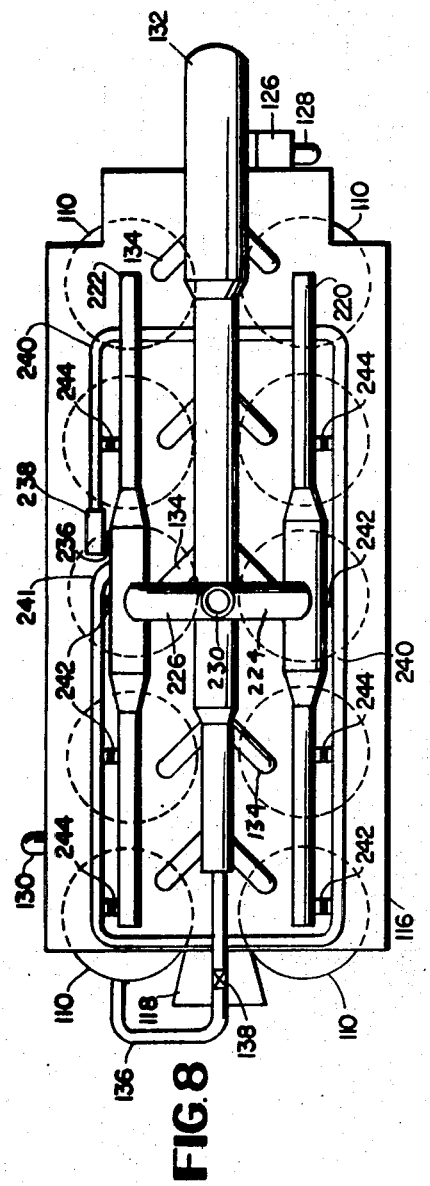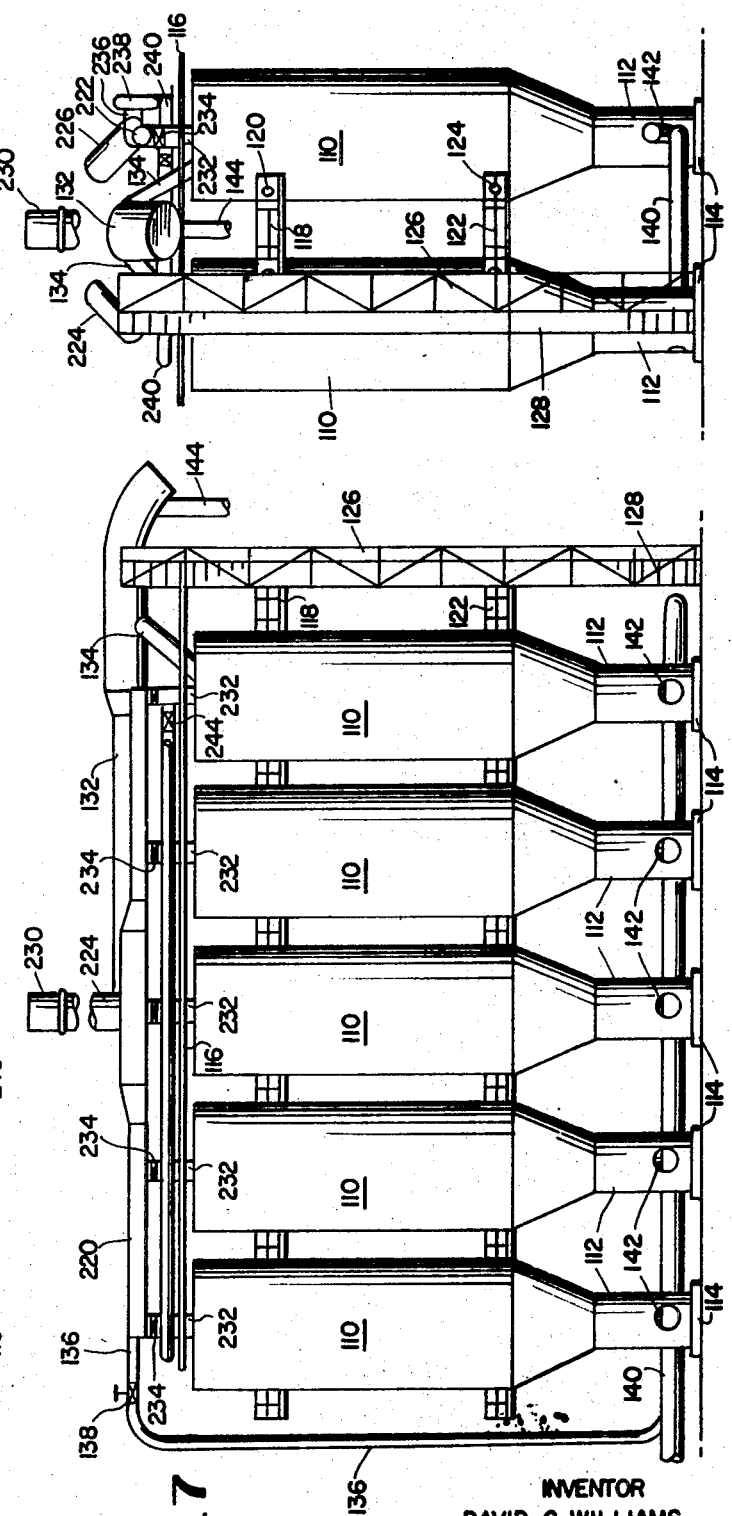

SOLID-GAS SEPARATING MEANS

The present application is a divisional application of application Ser. No. 579,576, filed Sept. 15, 1966, by the present inventor, entitled "SOLID-GAS SEPARATING MEANS," now U.S. Pat. No. 3,491,578.

The present invention relates to a novel bag-type filter means for separating solids from a solids-laden gas. More specifically, the present invention relates to a novel bag-type filter means for separating carbon black particles from a carbon black-laden smoke.

In the art of producing carbon black by pyrolysis a hot gaseous effluent or smoke at a temperature or about 1200° to 3000° F. emanates from the pyrolysis reactor. Generally, this carbon black-laden smoke is cooled to a temperature in the order of about 400° to 600° F. by quenching with water in the reactor and thereafter cooling in an external cooler. Generally the quenching operation consists of contacting the effluent near the exit of the reactor with a spray of water. The quenched effluent is then conveyed to the cooler and thereafter to a recovery system, wherein the carbon black is separated from the smoke. In order to recover the greatest amount of carbon black from the smoke and, additionally, in order to obviate creating a nuisance by discharging carbon black containing gas to the atmosphere, it is customary to filter the smoke through cloth or fabric bag-type filters. By and large the fabric bag-type filters used in the recovery of carbon black are glass cloth bags which are comparatively resistant to high temperatures and chemical attack. The latter is an important consideration since there are significant amounts of acidic components in carbon black smoke, particularly when employing feedstocks of petroleum origin. However, one prominent disadvantage of glass cloth bags is that they are subject to wear and deterioration by mechanical stress when subjected to conventional shaking operations which are normally practiced to maintain the bag filters clean and free of carbon black deposits adhering to the surface thereof.

The usual carbon black filter bag is closed at its top and this closed top is generally attached to the bag shaking means. The open lower end of the suspended bag is attached to tubular nipple or flange mounted over an aperture in a cell plate spanning the lower portion of the filter unit. The carbon black-laden smoke is introduced below the cell plate and passes upwardly to the interior of a plurality of such filter bags. Clarified gas or smoke passes through the bags to the exterior thereof in a filtering zone and thence to a clarified gas outlet. Most of the carbon black is retained on the surface of the bag. In a cleaning, or what is termed conventionally as a "repressuring," cycle, clarified gas obtained from one or more filter zones, which are in their filtering cycle, is introduced into the filter zone on the clarified gas side of the filter bags. The reverse flow of repressuring gas through the bags, coupled with the bag-shaking action, effectively cleans the bags of the accumulated layer of carbon black. Most of the carbon black drops into the bottom hopper of the filter unit and is suitably retrieved therefrom.

It has normally been proposed to discharge the carbon black from the filter unit hopper by means of a positive gas lock valve, such as a star valve or screw conveyor, in order to prevent passage of any significant amount of gas into the solids transport or recovery system. The solids transport system may include a screw conveyor or other appropriate transport means. It has heretofore been suggested that a part of the repressuring gas be used as a transport medium for the separated carbon black. However, it is obvious that such transport gases are subject to serious fluctuations in pressure even when all of the repressure gas from one of a multiplicity of filter units is utilized.

Where a multiplicity of parallel-connected filter units is employed there is a problem of maintaining an even and continuous flow of carbon black-laden smoke to the filter units and also in maintaining an even and continuous flow of separated carbon black from the units.

Where a multiplicity of parallel-connected filter units is employed there is a problem of maintaining an even and continuous flow of carbon black-laden smoke to the filter units and also in maintaining an even and continuous flow of separated carbon black from the units.

Where a multiplicity of filter cells are utilized in the separation of carbon black from carbon black-laden smoke, there are also serious problems of corrosion which occur in the repressuring system. Since only one or less than all of the units undergoes repressuring at any given time, it is obvious that the manifold line supplying repressuring gas to the system will have intermittent flow therethrough and flow at one end in the manifold may be stagnant for considerable periods of time. As a result, this portion of the manifold cools, condensation occurs in the manifold and, subsequently, corrosion of the system occurs.

It is therefore an object of the present invention to provide an improved bag-type filter means. A further object of the present invention is to provide an improved bag-type filter means for removing carbon black from a carbon black-laden smoke. Yet another object of the present invention is to provide an improved bag-type filter for removing solids from a solids-laden gas, which includes a novel separated solids discharge means. Another and further object of the present invention is to provide a multiunit filter system having a novel transport system for separated solids. A still further object of the present invention is to provide an improved multiunit filter system having a novel closed-loop repressure system. Another and further object of the present invention is to provide an improved multiunit filter system having a novel transport system for separated solids and a novel closed-loop repressure system. Yet another object of the present invention is to provide an improved multiunit filter system having a novel flow system through a plurality of tubular open ended bags, a novel separated solids discharge system, a novel separated solids transport system and a novel repressuring system. These and other objects and advantages of the present invention will be apparent from the following detailed description when read in conjunction with the drawings, wherein:

FIG. 4 is an enlarged, detailed view, partially in section, of the means for mounting the upper portion of a bag in the filter of FIG. 1;

FIG. 5 is an enlarged detailed view, partially in section, of the means for mounting the lower end of a bag in the filter of FIG. 1;

FIG. 7 is a side elevational view of a multiunit filter system;

FIG. 8 is a top view of the filter system of FIG. 7;

FIG. 9 is an end elevational view of the system of FIG. 7;

FIG. 10 is an isometric, schematic drawing of the solids transport system; and

Figure 1:
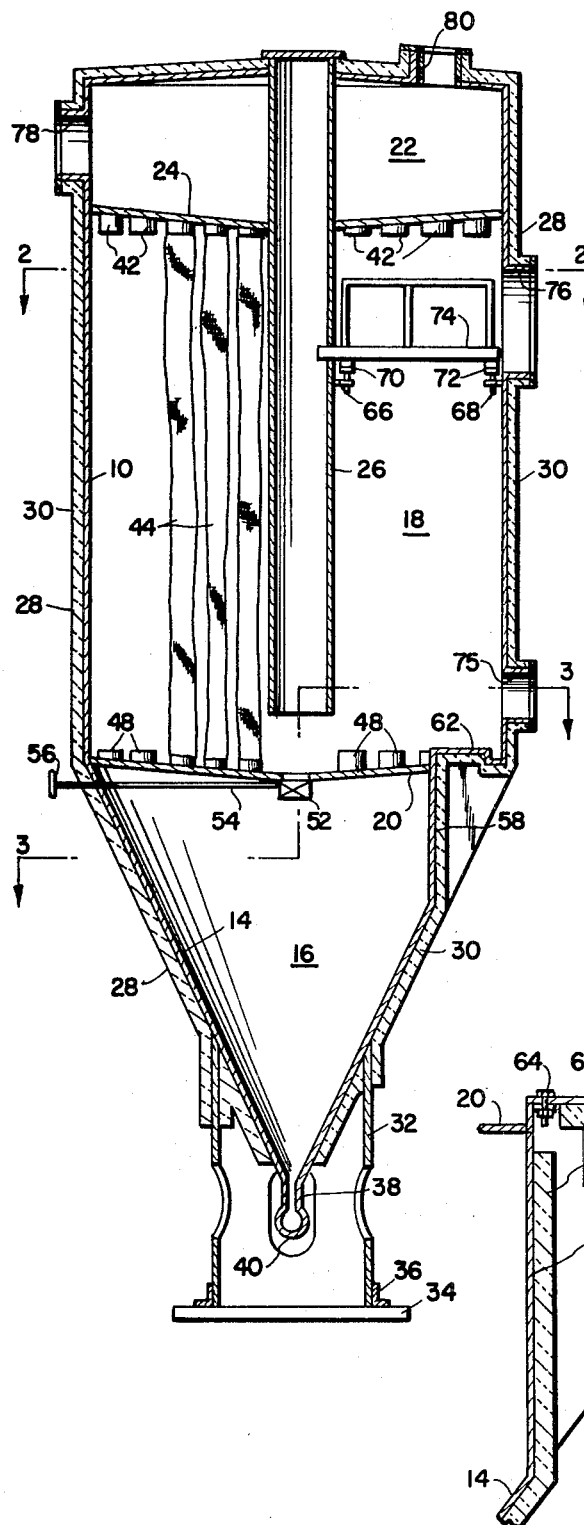
FIG. 1 is a front elevational view, partially in section, of a filter unit of the present invention.
Figure 2:
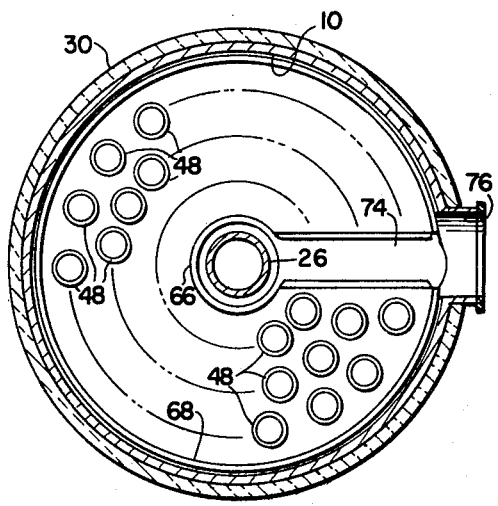
FIG. 2 is a cross-sectional view taken along the line 2—2 of FIG. 1.
Figure 3:
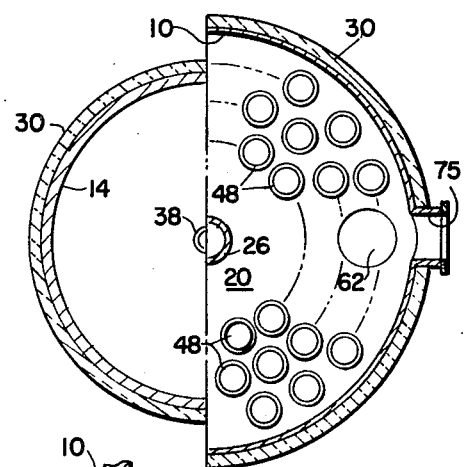
FIG. 3 is a cross-sectional view taken along the line 3—3 of FIG. 1.
Figure 6:
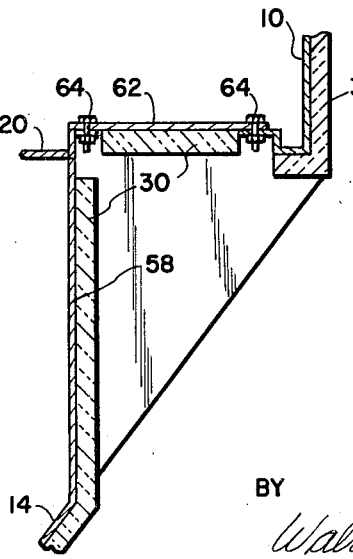
FIG. 6 is an enlarged detailed view, partially in section, showing the means of access for inserting bags through the lower portion of the filter zone of the filter of FIG. 1.

In accordance with the present invention, it has been surprisingly discovered that solids may be effectively separated from solids-laden gas in a novel downflow filter having tubular open ended bags; and that, contrary to the prior art, the separated solids can be continuously discharged from the filter along with a small portion of the solids-laden gas. It has also been surprisingly discovered that a portion of the solids-laden gas discharged along with separated solids can be used as a transport medium along with a part of the solids-laden gas taken from the gas inlet to the filter system. A further surprising discovery of the present invention is that a filter system can be provided with a closed-loop repressuring system and thereby eliminate, to a great extent, uneven flow and corrosion in the repressure system. The following detailed description taken in conjunction with the drawings will illustrate these novel features.

FIGS. 1 through 6 of the drawings illustrate the details of construction of a preferred filter unit in accordance with the present invention.

In accordance with these drawings, the main body of the filter unit is comprised of a cylindrical steel shell 10, terminating at its upper end in slightly inclined top closure 12 and at its lower end in a downwardly converging cone or hopper 14. The lower hopper zone 16 is adapted to receive separated solids and is separated from the central filter zone 18 by downwardly inclined lower cell plate 20. In like manner, central filter zone 18 is separated from upper deceleration and distribution zone 22 by upper cell plate 24, which is also inclined downwardly toward its center. Passing along the central axis of filter zone 18 from a point just above lower cell plate 20 and thence through distribution zone 22 and out through top closure 12 of the unit is a clarified gas outlet duct 26. Circling the exterior of shell 10 and hopper 14 at spaced vertical points are insulation support ribs 28. These support ribs 28 support a layer of insulation 30, which surrounds the entire unit. Inasmuch as any metal structure which comes in contact with the filter unit must be well insulated beyond the point of contact and also must be periodically sand blasted and painted, the insulation and maintenance of such support structures is a considerable problem. Accordingly, the present filtering unit has no superstructure supporting the unit but is almost totally supported by cylindrical skirt 32. Skirt 32 is appropriately welded to the exterior of cone 14 at a point approximately midway between the top and bottom of the cone. Skirt 32 is attached at its bottom end to a base 34 by means of a rolled angle 36 welded to the skirt. Because of this novel support structure and means of supporting the filtering unit, it is possible to attach all necessary platforms and the like to the shell itself by means of lugs extending from the exterior of the unit. Located at the outlet of cone 14 is an orifice-type solids discharge means 38. Orifice 38, as will be pointed out in more detail hereinafter, is open at all times but is sized in a manner to permit discharge of solids while at the same time providing a continuous leak of gas to horizontally disposed solids transport duct 40. Upper cell plate 24 has formed therein a plurality of circular apertures. These circular apertures are extended downwardly by means of short tubular thimbles or bag-connector means 42. Thimbles 42 vary in length so that their lower ends terminate at the same vertical plane. Thus, thimbles 42 form an upper terminus for filter bags 44. Filter bags 44 are cylindrical, tubular bags having both ends open. The upper ends of bags 44 are slipped over upper thimbles 42 and held in place by banding 46. Bags 44 terminate at their lower ends of lower thimbles 48 which extend upwardly from a plurality of circular apertures formed in lower cell plate 20. Thimbles 48 are also of different lengths so that their ends terminate at a single horizontal plane. Bags 44 have their lower ends attached to thimbles 48 by means of appropriate banding 50. Lower cell plate 20 also has formed therein a central opening which is extended by downwardly projecting tube 52. Mounted in tube 52 is floor cleanup valve 54, whose valve handle 56 extends through hopper zone 16 to the exterior thereof. Valve 54 is, of course opened for the purpose of cleaning up the upper surface of lower cell plate 20. For such cleanup operations and for the insertion of bags in filter chamber 18 a semicylindrical, vertically disposed depression 58 is formed in the outer surface and adjacent the top of cone 14 and extends upwardly through lower cell plate 20. The semicylindrical depression terminates at its upper end in an annular flange or step 60 above the level of lower cell plate 20. Normally, the opening formed by semicylindrical depression 58 is closed by plate 62 held to step 60 by means of bolts 64. A manway 75 can also be provided for access to the cell. Provision is also made for the servicing of bags adjacent the top of filter zone 18. For this purpose, track 66 is formed annularly about outlet duct 26. At the same horizontal plane, track 68 is formed about the interior of shell 10. Mounted on tracks 66 and 68 through rollers or wheels 70 or 72, respectively, is bag service platform 74. Bag service platform 74 serves as a platform for a man to attach or remove the upper ends of bags 44 on or from thimbles 42. Access to this platform and an opening for removing the platform, if desired, is provided through manway 76 through the side of shell 10. For like access to the upper surface of upper cell plate 24, an appropriate manway 78 passes through shell 10 at an appropriate point along the height of the shell. A solids-laden gas inlet connection 80 is formed in top closure 12 for the introduction of solids-laden gas to deceleration and distribution zone 22.

FIGS. 7, 8, 9 and 10 of the drawings illustrate a multiunit filter system in accordance with the present invention; including, a novel separated solids transport system.

In accordance with the drawings, the system, as shown, comprises 10 filter units 110 arranged in two parallel rows. By way of example, to show the proportions and arrangement, a typical cell 110 will be about 15 feet in diameter, each pair of cells will be spaced on centerlines about 17 feet apart and the centerlines through the two rows will be spaced about 19½ feet from one another. The cells are substantially completely supported by individual skirt units 112 into which a portion of the cone or hopper section of the cell 110 passes and to which the hopper portion is welded. Skirts 112 are in turn attached to base elements 114. Extending across the top of the entire system of filters 110 is a valve service platform 116. Lower down the filters 110 and attached to the interior sides of the units is an upper cell service platform 118 which provides access to the upper portion of the filter unit for the removal and attachment of the upper ends of filter bags. Such access is provided through manways 120. Adjacent the lower end of filter units 110 and attached to the interior sides of the units is lower cell plate service platform 122 which permits access to the lower portion of the filter through manholes 124, for purposes of attaching and detaching the lower ends of the bag elements. Extending from ground level to valve service platform 116 is man-lift 126. Appropriate caged ladders 128 and 130 also provide access to platforms 116, 118 and 122.

Extending between the rows of filters 110 above valve service platform 116 is solids-laden gas inlet manifold or header 132 for the introduction to the filter units of solids-laden gas. Such introduction is provided by side branches 134 which extend from manifold 132 downwardly into filter units 110. Manifold 132 forms a portion of the novel separated solids transport system of the present invention. It is also to be noted that manifold 132 is of diminishing cross section from its inlet end to its terminus at the fifth pair of filter units. For example, the drawings show a stepped design wherein the bottom of the manifold is straight, the initial section is about 60 inches in diameter adjacent the first two filters. The diameter then diminishes to about 54 inches adjacent the second and third pair of filters and, finally, diminishes to a 36-inch diameter adjacent the fourth and fifth pairs of filters. This diminishing cross section can also be continuous rather than stepped. In any event, the diminishing cross section of header 132 accommodates the decrease in volume of solids-laden gas caused by the withdrawal by the filters and provides a constant and even flow through the manifold with no low or high-pressure spots at any point. Obviously, with such continuous, even flow, filtering will be much more effective and consistent from one unit to another. Extending from the terminal end of inlet manifold 132, adjacent the fifth pair of filters 110 is withdrawal line 136. Withdrawal line 136 provides a continuous, small flow of solids-laden gas from inlet manifold 132 to act as a transport gas stream for separated solids, as hereinafter pointed out. Withdrawal line 136 is provided with valve 138 adapted to adjust the amount of gas withdrawn. Withdrawal line 136 passes to the end of solids transport manifold 140 adjacent the rearmost one of the fifth pair of filter units 110. Transport manifold 140 passes down the rearward row of filters 110 and then loops back below the front row of filter units 110 and is connected to and in open communication with the solids discharge means 142 of each of filter units 110. Transport manifold 140 then passes to appropriate apparatus (not shown) for further processing of the solids. In the preferred embodiment of the present invention transport manifold 140 gradually increases in diameter as it passes from the first to the last filter unit 110 to accommodate the solids plus gas added to the manifold by each successive unit. In the exemplified system it will initially be the same size as line 136, that is, 8 inches in diameter, adjacent the rearward filter of the fifth row and then increase in diameter to about 15 inches adjacent the solids discharge means of the forward filter of the fifth row. Thus, an even, continuous flow of solids through the transport manifold 140 can be provided with no hang-up of solids, no low or high pressure spots and dead spots in the manifold. Also, in the preferred embodiment, the solids discharge means 142 of filter units 110 are orifices which provide a continuous leakage of hot gas into transport manifold 140. Orifices 142 are of decreasing size from the rearward one of the fifth pair of filter units 110 to the forward one of the fifth pair of filter units 110. Accordingly, the orifices provide a portion of the gas necessary to convey solids in transport manifold 140. For example, about half of the transport gas may be supplied by withdrawal line 136, while the other half is supplied from the filter units 110 through orifices 142 along with the discharge of the solids through the orifices. It is also obvious that by sizing the orifices as indicated the flow through transport manifold 140 will be continuous and constant. After solids-laden gas from transport manifold 140 has passed through appropriate collection and processing equipment, the gas passes back to inlet manifold 132 by means of recycle line 144. Thus, a closed loop system may be provided. Recycle line 144 will normally be the same size as the terminal end of transport manifold 114, or specifically, about 15 inches in diameter.

FIG. 10 of the drawings is an isometric, schematic drawing of the novel closed loop solids transport system for conveying solids discharge means of a plurality of filter units.

According to the drawing, solids-laden gas is introduced to the system through inlet duct 150. Inlet 150 is of successively smaller diameter from its inlet to its terminal end. By way of specific example, if a series of ten filter units are to be supplied with solids-laden gas and each of these units is 15 feet in diameter the initial cross section of the inlet duct 150 should be about 60 inches until it passes the first pair of filters. Duct 150 should then reduce to about 54 inches in diameter as it passes the second and third pairs of filters and, finally, reduce to about 36 inches in diameter as it passes the fourth and fifth pairs of filters. From the terminal end of inlet duct 150 solids-laden gas withdrawal line 152 takes a portion of the gas from duct 150, passes it through control valve 154, which is adapted to adjust the volume of gas passing through line 152, and thence to solids transport line 156 which passes beneath and in open communication with the filter units. More specifically, transport line 156 first passes filter unit 158, which for illustrative purposes is the rearward one of the fifth pair, 160, which is the rearward filter of the fourth pair, 162, representing the rearward filter of the third pair, 164, the rearward one of the second pair, 166, the rearward one of the first pair, 168, the forward or front one of the first pair, 170, the front one of the second pair, 172, the front one of the third pair, 174, the front one of the fourth pair, and 176, the front one of the fifth pair. Transport line 156 is preferably of continuously increasing cross section or of stepped cross section as it passes from filter 158 to filter 176. Taking the specific example previously discussed, withdrawal line 152 will be about 8 inches in diameter and line 156 will have the following diameters: 8.7 inches between 158 and 160; 9.6 between 160 and 162; 10.4 between 162 and 164; 11.1 between 164 and 166; 11.9 between 166 and 168; 12.55 between 168 and 170; 13.15 between 170 and 172; 13.8 between 172 and 174; 14.4 between 174 and 176 and 15 beyond 176. Filters 158 through 168 have outlet means 178, 180, 182, 184, 186, 188, 190, 192, 194, and 196, respectively. In the preferred embodiment of the present invention, a portion of the transport gas is continuously supplied through outlet means 178 through 196. For this purpose, outlet means 178 to 196 are orifice means of gradually decreasing diameter. In other words, the diameter of the orifice 178 is largest while the smallest diameter orifice is 196 and orifices 180 through 194 are intermediate these two sizes. For the system exemplified suitable orifice diameters will be 3.25, 3.10, 2.96, 2.78, 2.62, 2.44, 2.24, 2.02, 1.78, 1.5 inches, respectively. Solids and transport gas from transport line 156 pass through blower 198 to supply line 200 and thence to cyclone separator 202. In cyclone separator 202 the solids are separated from the transport gas and the solids are discharged from the bottom of cyclone 202 to grinders 204. Grinders 204 then transmit the separated solids to supply line 206 where the solids are again entrained in transport gas. Transport gas for supply line 206 passes from cyclone 202 and transports the ground solids to blower 208. Blower 208 transmits the transport gas and solids through line 210 to a second cyclone separator 212. Cyclone separator 212 effects the final separation of solids from transport gas. The solids are discharged through a positive, gas lock valve, such as a star valve 214, to a loose solids surge tank 216. The separated transport gas is then discharged to line 218 from whence it is returned to inlet duct 150.

FIGS. 7, 8, 9 and 11 illustrate a multiunit filter system in accordance with the present invention; including, a novel closed loop repressure system for a plurality of bag-type filters.

Clarified gas manifolds 220 and 222 are mounted above the front and rear rows of filter units 110, respectively. In the preferred embodiment manifolds 220 and 222 are of varying or stepped cross section, as shown in the drawings. If, for example, the filters 110 are 15 feet in diameter and there are 10 units, as shown, the manifolds are preferably about 48 inches in diameter where they serve the third or middle pair of filters and about 30 inches in diameter on either end where they serve the first and second and the fourth and fifth pairs, respectively. From the top of manifolds 220 and 222 branch ducts 224 and 226, respectively, connect the manifolds to a common discharge stack 228. At the top of discharge stack 228 is mounted a conventional burner 230, which further clarifies the exhaust gases before discharging the same to the atmosphere. Exhaust gas from filters 110 discharges through standpipes 232 which are connected at their lower ends to the outlet means of filters 110 and at the upper ends to manifolds 220 and 222, respectively. Mounted in the upper portion of each standpipe 232 is exhaust or clarified gas outlet valve 234 which is opened and closed for purposes of repressuring filter units 110. Leading from one of manifolds 220 or 222, in this case 222, is duct 236. Duct 236 withdraws a portion of the clarified gas from manifold 222 and feeds it to repressure blower 238. Repressure blower 238 discharges into looped repressure manifold 240. Manifold 240 forms a complete loop passing each of the standpipes 232 of filters 110 and then returns to manifold 222 and is controlled by valve 241. From loop 240 branch lines 242 pass to each standpipe 232 just below the valves 234. Each of the branch lines 242 also has mounted therein a repressure valve 244.

Figure 11:
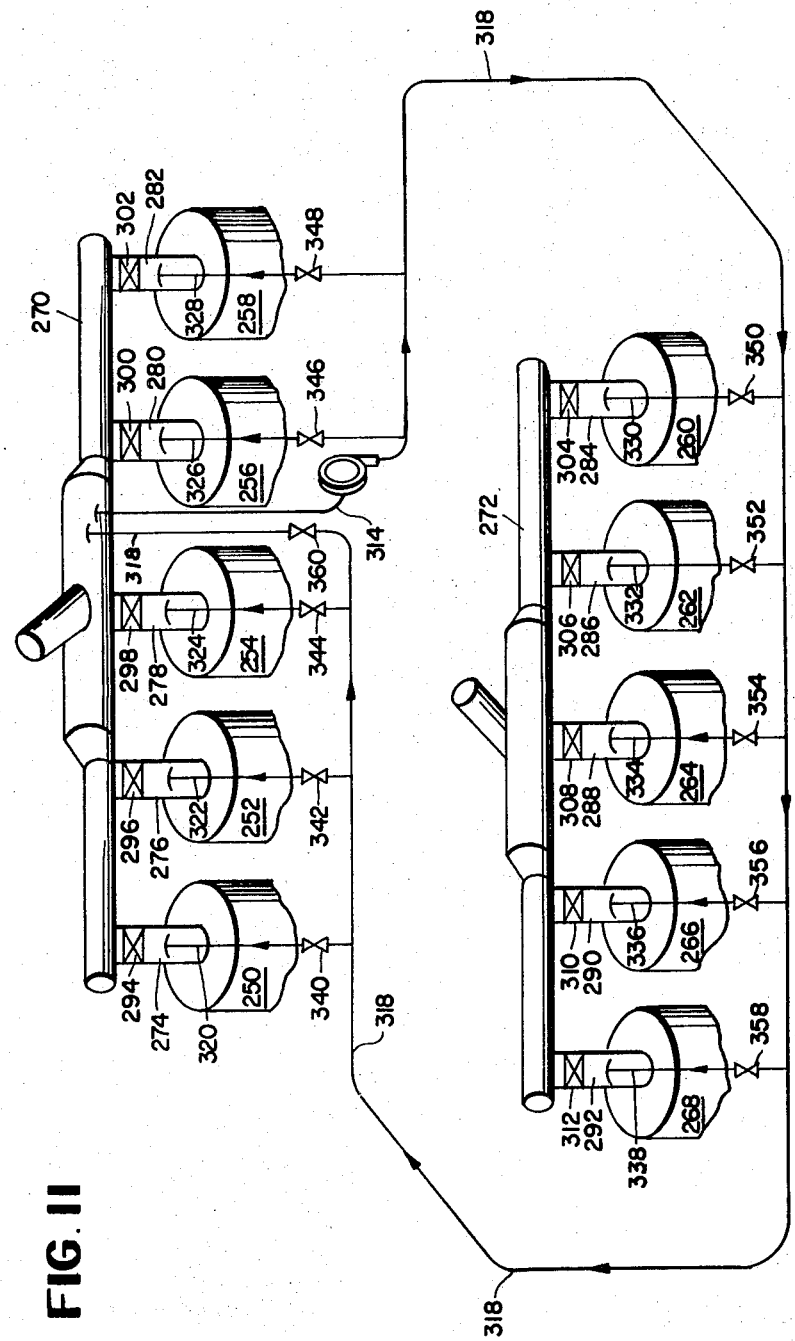
FIG. 11 is an isometric, schematic drawing of the repressure system.

FIG. 11 of the drawings shows a continuous-flow, closed loop repressure system for a plurality of carbon black, bag-type filters.

In accordance with FIG. 11, two parallel rows of five filters are shown. These filters are designated 250, 252, 254, 256, 258, 260, 262, 264, 266 and 268, respectively. Mounted above the rearmost row of filters 250 through 258 is a common header or manifold 270. A similar header or manifold 272 is disposed above the front row of filters 260 through 268. Clarified gas outlet manifolds 270 and 272 discharge into a common waste gas stack not shown. Leading from the clarified gas outlets of filters 250 through 268 are clarified gas standpipes 274, 276, 278, 280, 282, 284, 286, 288, 290 and 292, respectively. Mounted in standpipes 274 through 292 and adapted to open or close the standpipes for repressuring purposes are clarified gas discharge valves 294, 296, 298, 300, 302, 304, 306, 308, 310 and 312, respectively. Leading from either manifold 270 or 272, in the illustrated case 270, is clarified gas withdrawal line 314. Line 314 withdraws a portion of the clarified gas from manifold 270 by means of repressure blower 316. Repressure blower 316 discharges the clarified gas to looped repressure line or manifold 318. Looped line 318 passes the standpipes 274 through 292 of each of the filters and then returns to the same manifold 270. Leading from looped line 318 are repressuring branch lines 320, 322, 324, 326, 328, 330, 332, 334, 336, and 338. Mounted in each of branch lines 320 through 338 are repressure valves 340, 342, 344, 346, 348, 350, 352, 354, 356 and 358.

In operation, the continuous flow repressure system described above prevents condensation from forming within the repressure manifold and the subsequent corrosion of the manifold. Normally, a repressure system includes a manifold with a number of branch lines leading from the manifold to the filters. Since each filter is repressured individually and in series, flow through the manifold is intermittent. In addition, flow to one end of the manifold may be stagnant for considerable period of time. Under these stagnant conditions condensation occurs in the manifold. In the present instance blower 316 continuously withdraws clarified hot gas from outlet manifold 270 and circulates this gas past all of the filter units and back to manifold 270. This therefore provides a continuous flow through the manifold at all times during the operation of the filter units. As each of the repressure valves opens valve 360 in looped line 318 closes at least partially.

To give a typical example of the operation of a filter system, built in accordance with the present invention, a carbon black-laden smoke, produced by a plurality of furnace-type reactors designed and operating to produce ISAF black at a rate of about 69,900 cubic feet per minute at a temperature of 450° F. is utilized as a feed to the filter system. This smoke will introduce carbon black to the system at a rate of about 102 pounds per minute and gas to carbon black ratio of about 0.01465 pounds per cubic feet will exist. The minimum smoke velocity would be about 3,000 feet per minute. Such a volume of carbon black-laden smoke can be produced by a battery of about six pyrolytic reactors. Under these conditions, the minimum velocity in the solids transport manifold would be about 4,200 feet per minute. The gas to carbon black ratio in the transport system would be about 50 cubic feet of gas per pound of carbon black. The filter unit itself would have a filter cloth area of about 58,200 square feet actually in service and about 64,800 square feet total if a battery of 10 units is utilized with one unit on repressure at any given time. Accordingly, for the ten units, 6,480 square feet of bag area would be required per filter unit and if bags 30 feet long and 11½ inches in diameter are used, there would need to be 72 bags per cell. The rate of gas passage per filter cell would be about 7,780 cubic feet per minute and the rate of carbon black passage per cell about 11.3 pounds per minute. A 10-unit filter system having one unit on repressure at all times and nine units on the filter cycle and operating on the above-mentioned volumes of carbon black laden smoke can conveniently be operated on a time cycle of about 4 minutes or 240 seconds. Of this time cycle about 24 seconds would be consumed in a repressuring operation leaving about 216 seconds for the filter portion of the cycle. For example, in the repressuring of any one of the units, the first 4 seconds would be consumed in closing the outlet valve in the clarified gas discharge means and during this same period plus an additional 2 seconds of the cycle the repressure valve would be closed. From the sixth to the eighth second the repressure valve would be opening. From the eighth to the eighteenth second the repressure valve would be open and the clarified gas outlet valve closed. Thereafter, from the eighteenth to the twentieth second the repressure valve would be closing and from the twentieth to the twenty-fourth second the clarified gas outlet valve would be opening.

While specific means have been illustrated and specific examples and dimensions given herein, it is to be understood that various modifications of the system and the operation thereof will occur to one skilled in the art. Accordingly, it is to be understood that the present invention is not limited to these illustrations and examples, but is to be limited only in accordance with the appended claims.

I claim:

1. A solids transport system for a plurality of parallel-connected, bagtype filters, having a solids-laden gas inlet means connected to the tops of said filters and a separated solids outlet means connected to the bottoms of said filters; comprising, a solids-laden gas inlet manifold connected in parallel to said solids-laden gas inlet means, having a diminishing cross section from the first ones of said filters served to the last ones of said filters served and adapted to supply solids-laden gas to said gas inlet means; a solids-laden gas withdrawal line connected to said inlet manifold and adapted to withdraw a predetermined, small amount of solids-laden gas from said solids-laden gas inlet manifold; a separated solids transport manifold connected in series to each of said separated solids outlet means, having its inlet end connected to said solids-laden gas withdrawal line, having an increasing cross section from the first one of said filters served to the last one of said filters served and adapted to receive solids-laden gas from said solids-laden gas withdrawal line and separated solids from said filters; a recycle line having its inlet end connected to said separated solids transport manifold and its discharge end connected to said solids-laden gas inlet manifold and a means for separating solids from gas disposed in said recycle line between the connections thereof to said separated solids transport line and said solids-laden gas inlet manifold, said recycle line being adapted to recycle gas separated from solids to said solids-laden gas inlet manifold after solids have been removed therefrom; said separated solids outlet means having continuously open orifices therein of successively decreasing diameter from the first of said filters served by said separated solids transport manifold to the last of said filters served by said separated solids transport means; a clarified gas manifold connected to each row of said filters; a clarified gas discharge stack connecting all of said manifolds; a clarified gas repressure line connected to said clarified gas manifolds; a repressure valve means which is at least partially open at all times mounted in said repressure gas line; and branch lines leading from said repressure gas line to the clarified gas side of said filters; said repressure gas line being adapted to circulate gas from said clarified gas manifold through said repressure line and back to said clarified gas manifold and alternately to the clarified gas side of preselected ones of said filters for reverse flow through the filters.

2. Apparatus in accordance with claim 1 wherein the solids-laden gas inlet manifold has an essentially level bottom and the remainder thereof decreases in diameter in stepped fashion.

3. Apparatus in accordance with claim 1 wherein the means for separating solids from gas in the recycle line is at least one cyclone-type separator.

4 Apparatus in accordance with claim 1 wherein the clarified gas manifolds are of decreasing cross section from the center one of said filters served by said clarified gas manifold to the end ones of said filters served by said clarified gas manifold.

* * * * *

UNITED STATES PATENT OFFICE
CERTIFICATE OF CORRECTION

Patent No. 3,646,595            Dated February 29, 1972

Inventor(s) David C. Williams

It is certified that error appears in the above-identified patent and that said Letters Patent are hereby corrected as shown below:

In the heading under "Related U.S. Application Data," at line [60], delete "Ser. No. 579,576" and "Pat. No. 3,491,578" and substitute therefor respectively:

-- Ser. No. 579,567 --; and -- Pat. No. 3,491,518 -- .

In Column 1, line 2 delete "Ser. No. 579,576" and insert therefor -- Ser. No. 579,567 -- .

In Column 1, line 4, delete "Pat. No. 3,491,578" and insert therefor -- Pat. No. 3,491,518 -- .

Signed and sealed this 6th day of February 1973.

(SEAL)
Attest:

EDWARD M. FLETCHER, JR.            ROBERT GOTTSCHALK
Attesting Officer                   Commissioner of Patents